(No Model.)

E. H. CHESTERTON.
WAFFLE IRON HANDLE.

No. 427,835. Patented May 13, 1890.

WITNESSES:
J. A. E. Criswell
C. Sedgwick

INVENTOR:
E. H. Chesterton
BY
Munn & Co.
ATTORNEYS

UNITED STATES PATENT OFFICE.

ERNEST H. CHESTERTON, OF LOS ANGELES, CALIFORNIA.

WAFFLE-IRON HANDLE.

SPECIFICATION forming part of Letters Patent No. 427,835, dated May 13, 1890.

Application filed December 4, 1889. Serial No. 332,544. (No model.)

*To all whom it may concern:*

Be it known that I, ERNEST H. CHESTERTON, of Los Angeles, in the county of Los Angeles and State of California, have invented a new and Improved Waffle-Iron Handle, of which the following is a full, clear, and exact description.

This invention relates to waffle-iron handles, the object of the invention being to provide a handle which may be quickly and readily applied to the handle-socket of the iron; and to the end named the invention consists, essentially, of a double-armed spring strip, the ends of the arms being arranged to fit within the iron sockets, one or both of said arms being formed with projections adapted to bear against shoulders formed on said iron sockets, all as will be hereinafter fully explained, and specifically pointed out in the claims.

Reference is to be had to the accompanying drawings, forming a part of this specification, in which similar figures of reference indicate corresponding parts in all the views.

Figure 1:
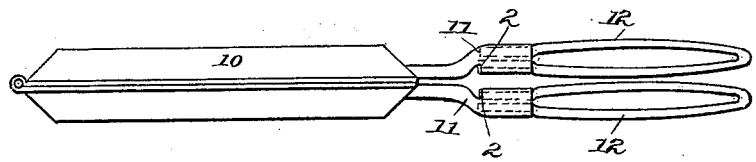
Figure 2:
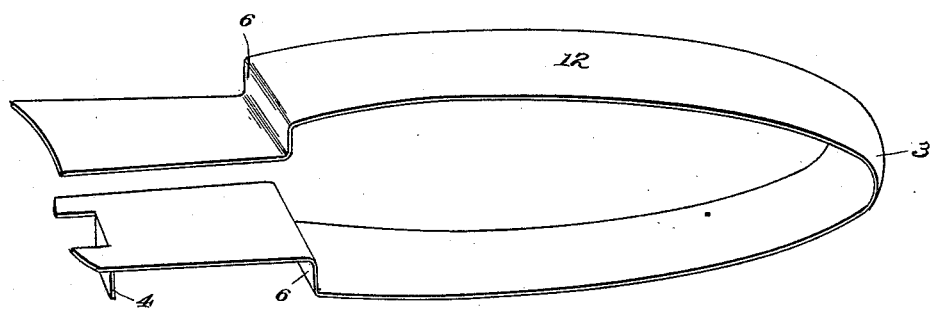
Figure 3:
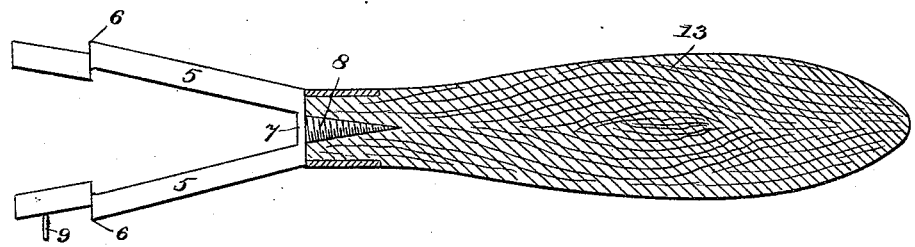
Figure 4:
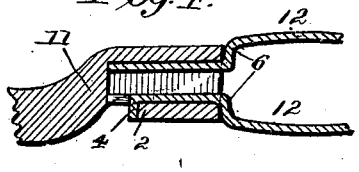

Figure 1 is a side view of a waffle-iron, representing the same as it appears when provided with my improved handle. Fig. 2 is a perspective view of one of the handles. Fig. 3 is a sectional view of a modified form of handle. Fig. 4 is a detail sectional view of one socket and the handle engaged therewith.

In the drawings, 10 represents a waffle-iron, each section of the iron being formed with a socket 11, having shoulders 2, such sockets being adapted to receive the ends of the handle. The handle is preferably formed from a strip of spring-steel 12, that is bent at 3 and formed with a projection 4 and shoulders 6, the projection 4 being formed upon one or both of the handle members.

In applying the handle the ends of the strip are pressed together, and such ends are passed into the socket. Then when the pressure is released the members will spring apart and their projections 4 will bear against the shoulders 2 of the iron socket, the shoulders 6 preventing the handle from pressing too far inward.

Instead of a single spring-strip such as shown in Figs. 1 and 2, I might employ a handle formed with members 5 5, that are connected by a head 7, upon which there is formed a threaded stem 8, adapted to fit within a wooden handle 13, one or both of the handle members being formed with a projection 9 and with shoulders 6, as shown. This handle is applied in the same manner, the two members being pressed together prior to their introduction into the handle ends of the sockets 11.

Such a handle as the one described will not char or burn, may be readily applied, and is withal simple, cheap, and durable.

Having thus described my invention, I claim as new and desire to secure by Letters Patent—

1. A handle for waffle-irons, consisting in two connected members or arms, the outer ends of which are normally sprung apart, provided with shoulders, and a laterally-extending projection at the free end of one of said arms beyond the shoulder, substantially as set forth.

2. A handle for waffle-irons, consisting of a strip of spring metal bent upon itself to form two arms normally sprung apart at their free ends, a shoulder 6 near the free end of each arm, and a laterally-extending projection 4 at the free end of one of said arms, substantially as set forth.

3. The combination, with a waffle-iron having sockets 11, each provided with a shoulder 2, of handles, each consisting in two connected members or arms adapted to enter said sockets, one arm of each handle having a lateral projection to engage the shoulder 2, substantially as set forth.

ERNEST H. CHESTERTON.

Witnesses:
TOM HORNE,
WILLM. DAVIS.